United States Patent [19]

Kishi et al.

[11] Patent Number: 4,825,316
[45] Date of Patent: Apr. 25, 1989

[54] THERMAL DEFORMATION CONTROLLED ENCLOSURE FOR A DISK DRIVE SYSTEM

[75] Inventors: Toru Kishi, Zama; Takashi Saito, Ayase, both of Japan

[73] Assignee: Victor Company of Japan, Limited, Yokohama, Japan

[21] Appl. No.: 72,071

[22] Filed: Jul. 10, 1987

[30] Foreign Application Priority Data

Jul. 17, 1986 [JP] Japan ................................ 61-168756

[51] Int. Cl.$^4$ ............................................ G11B 17/02
[52] U.S. Cl. .................................................. 360/97.02
[58] Field of Search ..................................... 360/97–99

[56] References Cited

U.S. PATENT DOCUMENTS 4,488,192 12/1984 Treseder ............................... 360/97
4,556,969 12/1985 Treseder et al. ...................... 360/97

Primary Examiner—Robert S. Tupper
Attorney, Agent, or Firm—Jordan and Hamburg

[57] ABSTRACT

An enclosure for a disk drive which may serve as an external store of a computer is constituted by a two-sided printed circuit board, a frame, and a top board, the printed circuit board being loaded with a disk driving section. The printed circuit board, frame, and top board have substantially the same coefficient of linear thermal expansion. The printed circuit board is prevented from being deformed by heat, so that the accuracy of the disk driving section is maintained to insure stable recording and playback.

5 Claims, 3 Drawing Sheets

THERMAL DEFORMATION CONTROLLED ENCLOSURE FOR A DISK DRIVE SYSTEM

BACKGROUND OF THE INVENTION

The present invention relates to an enclosure for a disk drive which is adapted to hermetically accommodate a magnetic disk or like recording medium, and a section adapted to drive a magnetic head and others.

A hard disk drive (HDD) with which a hard disk is used as a recording medium is an example of disk drives known in the art. In a HDD, a magnetic head is held in contact with a disk and, as soon as the disk is caused to rotate at high speed, slightly raised away from the disk by a stream of air as produced by the disk. This kind of system is generally referred to as a contact start and stop system. Usually, the amount of rise of the magnetic head above the disk surface is approximately 0.3 to 0.4 microns. Should dust the particle size of which is approximate to that of smoke be admitted into such a narrow gap between the disk and the magnetic head, the head would damage the disk surface to prevent information to be stably recorded in and reproduced from the disk. A prerequisite is, therefore, that the disk to be rotated and the magnetic head to scan the disk be hermetically received in an enclosure.

A prior art hard disk drive of the kind described is generally made up of a disk, a pair of magnetic heads located, respectively, above and below the disk to scan it, and a two-sided printed circuit board loaded with circuit parts and elements on both surfaces thereof and provided with a base which is made of iron. Such structural parts of the disk drive are hermetically received in an enclosure which is constituted by the printed circuit board, a top board made of aluminum or like material, and a frame made of synthetic resin, thereby being isolated from the outside. A current trend in the art of such hard disk drives is toward the miniature design of the overall construction. Miniaturization is achievable by, for example, using the two-sided printed circuit board for a part of the enclosure. Specifically, the printed circuit board, the top board and the frame may be arranged parallel to each other in order to use the printed circuit board for the bottom board.

Assuming that the disk drive is built in an apparatus to serve as an external store of a computer, the enclosure made up of different members such as the printed circuit board, top board and frame having individual coefficients of thermal expansion undergoes deformation due to changes in the ambient conditions such as temperature within the apparatus, based on the principle of a bimetal. Even the slightest deformation of the printed circuit board caused by the deformation of the enclosure would translate into a change in the gap between the disk and each magnetic head, i.e., such would raise one magnetic head beyond a predetermined level to bring about spacing and increase the load acting on the other magnetic head due to the deformation. In such a condition, the magnetic heads would be prevented from being accurately aligned with a desired track on the disk and, therefore, fail to perform accurate recording and playback.

SUMMARY OF THE INVENTION

It is therefore an object of the present invention to provide an enclosure which allows a disk drive received in the enclosure to record and reproduce information with stability.

It is another object of the invention to provide an enclosure for a disk drive which eliminates deformation of a two-sided printed circuit board which is loaded with various circuit parts and elements.

It is another object of the invention to provide a generally improved enclosure for a disk drive.

An enclosure according to the present invention for use with a disk drive having a disk driving section for causing a magnetic head to scan a recording medium, which is driven in a rotational motion, relatively to the recording medium comprises a first board constituting a base board of the enclosure, a second board constituting a top board of the enclosure for hermetically confining the disk driving section in cooperation with the first board, and a frame disposed between the first and second boards. The first board, second board and frame have substantially a same coefficient of linear thermal expansion.

The above and other objects, features and advantages of the present invention will become more apparent from the following detailed description taken with the accompanying drawings.

DESCRIPTION OF THE PREFERRED EMBODIMENT

Figure 1:
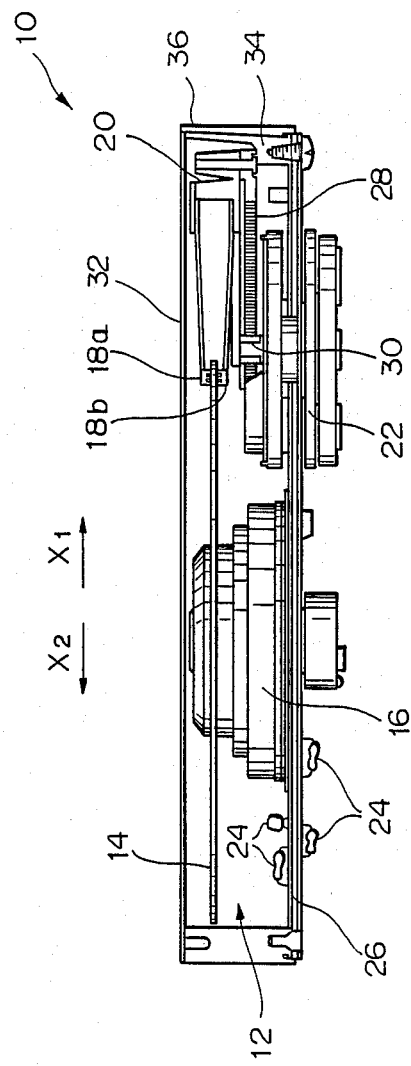
FIG. 1 is a vertically sectioned side elevation of a prior art disk drive.

To better understand the present invention, a brief reference will be made to a prior art disk drive, shown in FIG. 1. As shown, the prior art disk drive 10 includes a disk driving section 12 which is generally made up of a spindle motor 16 for rotating a disk 14, a head transport mechanism 20 provided with an upper and a lower magnetic head 18a and 18b, and an access motor 22 for driving the head transport mechanism 20 and access motor 22 are provided on a two-sided printed circuit board 26. Having a sheet of iron as a base, the printed circuit board 26 is provided with circuit patterns on both sides thereof to be loaded with circuit parts and elements 24 as desired.

A rack gear 28 is formed integrally with the head transport mechanism 20 and held in constant mesh with a pinion gear 30, which is mounted on the output shaft of the access motor 22. In this construction, as the pinion gear 30 is rotated, the head transport mechanism 20 is linearly moved in any of opposite directions as indicated by arrows $X_1$ and $X_2$. This causes the magnetic heads 18a and 18b to scan both sides of the disk 14 which is in rotation, whereby information is recorded in or reproduced from the disk 14. The driving section 12 of the disk drive 10 is hermetically accommodated in an enclosure 36. Specifically, in the enclosure 36, the driving section 12 is isolated from the outside by the printing circuit board 26, a top board 32 made of aluminum or like material, and a frame 34 made of synthetic resin and interposed between the printed circuit board 26 and the top board 32.

A drawback with the prior art enclosure 36 is that, as discussed earlier, the printed circuit board 26, top board 32 and frame 34 individually undergo deformation when the temperature within the enclosure 36 is changed, because their coefficients of thermal expansion are different from each other. Especially, even the slightest degree of deformation of the printed circuit board 26 directly translates into a change in the gap between the disk 14 and each head 18a or 18b, eventually preventing information from being recorded or reproduced with accuracy.

Figure 2:
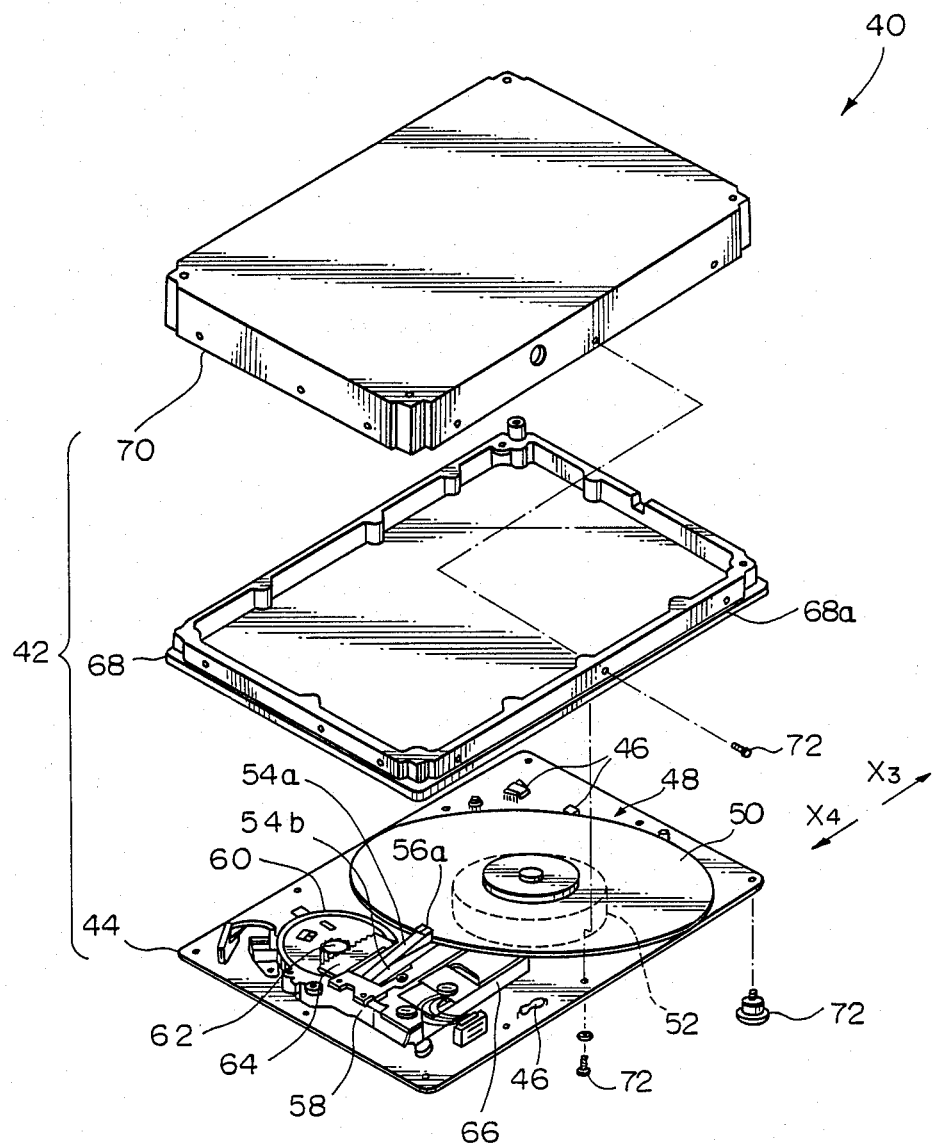
FIG. 2 is an exploded perspective view of an enclosure for a disk drive embodying the present invention.
Figure 3:
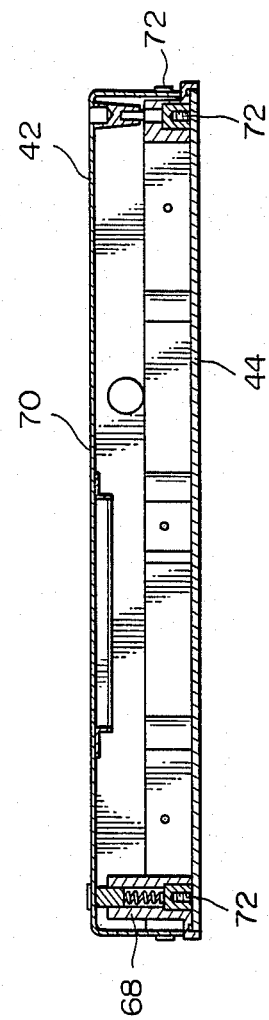
FIG. 3 is a vertically sectioned side elevation showing the enclosure of FIG. 2 in an assembled condition.

Referring to FIG. 2, a disk drive 40 and an enclosure 42 embodying the present invention and applied to the disk drive 40 are shown. FIG. 3 shows the enclosure 42 in an assembled condition. As shown in FIG. 2, a two-sided printed circuit board 44 as a first board which constitutes a part of the enclosure 42 includes a base which may comprise a cold-rolled sheet steel adapted for squeezing (SPCD) the surface of which is hot-dipped with aluminum, insulating layers of glass, epoxy or the like provided on the upper and lower surfaces of the base, and circuit patterns each formed by using a copper foil pattern, solder plating, photoresist or the like through a respective one of the insulating layers. The printed circuit board 44 has a predetermined coefficient of linear thermal expansion, e.g. $1.1 \times 10^{-5}/°C$. Circuit parts and elements are provided on the upper and lower surfaces of the printed circuit board 44. Further, a disk driving section 48 which is similar to that of FIG. 1 is mounted on the upper surface of the printed circuit board 44.

Specifically, the disk driving 48 comprises a spindle motor 52 for rotating a disk 50, a head transport mechanism 58 provided with an upper and a lower magnetic head 56a and 56b which are located to face the disk 50 through, respectively, leaf springs or like resilient means 54a and 54b, and an access motor 60 for driving the head transport mechanism 58. Such a construction of the driving section 48 is generally identical with that of the prior art disk drive. A rack gear 64 is provided at one side of the head transport mechanism 58 and constantly meshed with a pinion gear 62, which is rigid on the output shaft of the access motor 60. In this construction, the output torque of the access motor 60 is transmitted by the pinion gear 62 to the rack gear 64. Then, the head transport mechanism 58 is moved in any of opposite directions as indicated by arrows $X_3$ and $X_4$ while being regulated by a slide unit 66, so that the magnetic heads 56a and 56b scan the disk 50 in rotation so as to record or reproduce information out of the disk 50.

A frame 68 which is disposed on the printed circuit board 44 is made of polypherene sulfide (PPS) resin and provided with a rectangular configuration. Since PPS resin has great affinity, the coefficient of linear thermal expansion of the frame 68 is free to design by using PPS resin as a base material and mixing carbon fibers, glass fibers and others with the base material at a desired ratio to the later. In this particular embodiment, the frame 68 is provided with substantially the same coefficient of linear thermal expansion (in this case, $1.1 \times 10^{-5}/°C$.) as the printed circuit board 44 by controlling the ratio between the base material and the fibers mixed with the base material. In practice, the frame 68 may be implemented with FZ-1140 (PPS resin with glass fibers) and CZ-1130 (PPS resin with carbon fibers) (both available from Dainippon Ink and Chemicals Inc.) which are mixed in a pellet form at a predetermined mixture ratio and, then, molded.

A top board 70 as a second board is bowl-shaped so as to hermetically cover the disk driving section 48 on the printed circuit board 44. The bop board 70 has substantially the same coefficient of linear thermal expansion as the printed circuit board 44 and frame 68. For example, the top board 70 may be implemented with a cold-rolled sheet steel for deep-squeezing (SPCE) which is painted black by electrodeposition.

In assembly, the frame 68 is placed on the printed circuit board 44 and, then, the top board 70 is engaged with the frame 68 along shoulders 68a of the latter. In this condition, the printed circuit board 44, frame 68 and top board 70 are fastened together by a plurality of screws 72 to complete the enclosure 42, as shown in FIG. 3. In this manner, the various mechanical parts and elements are hermetically confined in the enclosure 42.

When the enclosure 42 is installed in, for example, an apparatus which serves as an external store of a computer, none of its constituent parts is caused to deform alone against changes of ambient temperature, because all of the constituent parts have substantially the same coefficient of linear thermal expansion. This prevents the printed circuit board 44 from being deformed and, thereby, preserves the accuracy of the disk driving section 48 which is provided at the time of assembly. Hence, the magnetic heads 56a and 56b are allowed to record and reproduce information stably while each being maintained at a predetermined level in relation to the disk 50. During the assembly of the enclosure 42, an anaerobic uv adhesive which is based on denaturated acryl and little volatile is applied between the shoulders 68a of the frame 68 and those portions of the top board 70 which fit on the shoulders 68a, and to those portions where the screws 72 are driven to fix the printed circuit board 44 and the frame 68 to each other. Although the surface portions of such an adhesive may lose sealing ability due to aging, the adhesive maintains the enclosure hermetically sealed due to its anaerobic property to thereby insure isolation of the disk driving section 48 from the outside.

In summary, it will be seen that the present invention provides an enclosure for a disk drive which prevents a two-sided printed circuit board from being deformed by heat and, thereby, allows magnetic heads of a disk driving section, which is provided on the printed circuit board, to record and reproduce information stably without being affected in their levels relative to a disk or being misaligned with a track.

Various modifications will become possible for those skilled in the art after receiving the teachings of the present disclosure without departing from the scope thereof.

What is claimed is:

1. An enclosure for a disk drive having a disk driving section for causing a magnetic head to scan a magnetic disk which is driven in a rotational motion, the disk driving section including head transport means for causing the magnetic head to scan the recording medium and a spindle motor for supporting the magnetic disk and the head transport means, said enclosure comprising:
   a first board constituting a base board of the enclosure and having a core formed from a sheet metal, said first board supporting said spindle motor thereon, said first board including a two-sided printed circuit board provided with a circuit pattern on each of an upper and a lower surface thereof on which circuit parts and elements are mounted;

a second board constituting a top board of the enclosure for hermetically confining the disk driving section in cooperation with the first board and formed from a sheet metal; and a frame disposed between the first and second boards and formed from a molded plastic material;

the first board, second board and frame having substantially a same coefficient of linear thermal expansion.

2. An enclosure as claimed in claim 1, wherein the printed circuit board comprises a cold-rolled sheet steel for squeezing (SPCD).

3. An enclosure as claimed in claim 1, wherein the frame comprises polypherene sulfide resin.

4. An enclosure as claimed in claim 1, wherein the second board comprises a cold-rolled sheet steel for deep-squeezing (SPCE).

5. An enclosure as claimed in claim 1, wherein the coefficient of linear thermal expansion is $1.1 \times 10^{-5}/°$ C.

* * * * *